(12) United States Patent
Chung et al.

(10) Patent No.: US 7,949,248 B2
(45) Date of Patent: May 24, 2011

(54) CAMERA DEVICE

(75) Inventors: Feng-Cheng Chung, Miao-Li Hsien (TW); Jyh-Long Chern, Miao-Li Hsien (TW); Wen-Jang Jiang, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 0 days.

(21) Appl. No.: 12/503,966

(22) Filed: Jul. 16, 2009

(65) Prior Publication Data
US 2010/0129069 A1 May 27, 2010

(30) Foreign Application Priority Data
Nov. 26, 2008 (CN) .......................... 2008 1 0305732

(51) Int. Cl.
*G03B 15/03* (2006.01)
(52) U.S. Cl. ....................................... 396/176; 348/370

(58) Field of Classification Search ................ 396/79, 396/80, 98, 106, 176; 348/370, 371; 362/3, 362/16
See application file for complete search history.

(56) References Cited

U.S. PATENT DOCUMENTS

| 7,079,227 | B2 * | 7/2006 | Rembe et al. ................. 356/23 |
| 7,317,540 | B1 * | 1/2008 | Kim et al. ..................... 356/497 |
| 7,567,287 | B2 * | 7/2009 | Hyatt ............................. 348/340 |
| 2008/0068451 | A1 * | 3/2008 | Hyatt ............................. 348/36 |

\* cited by examiner

*Primary Examiner* — Clayton E LaBalle
*Assistant Examiner* — Autumn Parker
(74) *Attorney, Agent, or Firm* — Raymond J. Chew

(57) ABSTRACT

An exemplary camera device includes an optical lens module, an image sensor and a light emitting module. The optical lens module is for forming an image of an object on an image plane associated therewith. The image sensor is disposed on the image plane of the optical lens module and for capturing the image formed by the optical lens module. The light emitting module includes a transflective optical element and a light emitting element. The transflective optical element is located between the optical lens module and the image sensor. The light emitting element faces towards the transflective optical element.

6 Claims, 2 Drawing Sheets

CAMERA DEVICE

BACKGROUND

1. Technical Field

The present disclosure generally relates to camera devices, particularly, to a camera device capable of improving image brightness thereof.

2. Description of Related Art

Nowadays, camera devices are broadly used for capturing images. Generally, a camera device is equipped with an external flash lamp for illuminating objects when the ambient brightness is poor, therefore image luminance of the objects can be improved. However, the external flash lamp requires an additional amount of space, thus further increasing the overall size of the camera device. Alternatively, one of the ways for reducing the size of the camera device is to decrease the aperture coefficient of a camera device. However, decrease of the aperture coefficient leads to undesired poor definition of images.

Therefore, what is needed is a camera device that overcomes the described limitations.

BRIEF DESCRIPTION OF THE DRAWINGS

Many aspects of the disclosed camera device can be better understood with reference to the following drawings. The components in the drawings are not necessarily drawn to scale, the emphasis instead being placed upon clearly illustrating the principles of the present camera device. wherein.

DETAILED DESCRIPTION

Reference will now be made to the drawings to describe the embodiments of the camera device, in detail.

Figure 1:
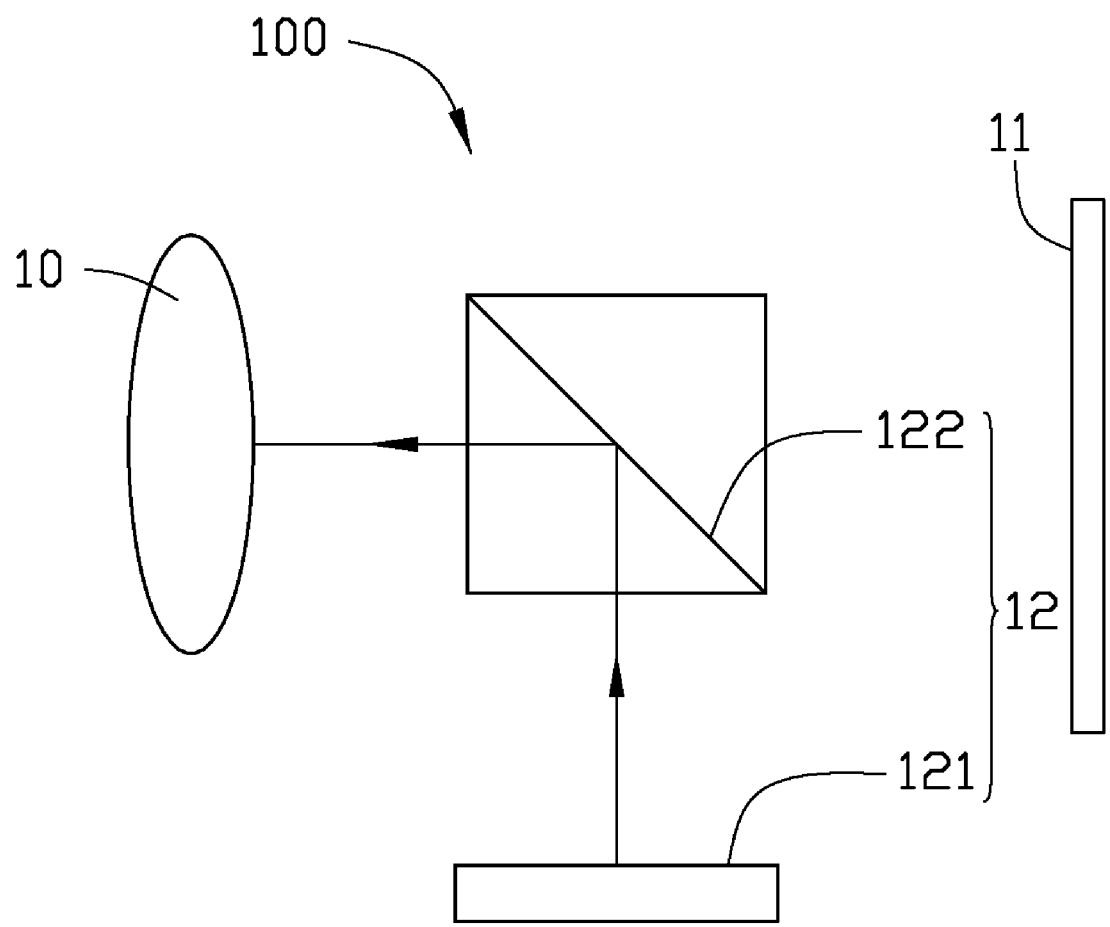
FIG. 1 is a schematic view of a camera device, according to an exemplary embodiment.

Referring to FIG. 1, a camera device 100, according to a first embodiment, includes an optical lens module 10, an image sensor 11 and a light emitting module 12.

The optical lens module 10 is for converging light emitted from an object (not illustrated) to form an image of the object on an image plane associated therewith.

The image sensor 11 is disposed on the image plane of the optical lens module 10, thereby captures the image formed by the optical lens module 10.

The light emitting module 12 comprising a light emitting element 121 and a transflective optical element 122.

The light emitting element 121 includes a light emitting diode, a light emitting diode chip or a light emitting diode module. In an exemplary embodiment, the light emitting element 121 is configured for emitting white light. The light emitting element 121 faces towards the transflective optical element 122, thereby emits light to the transflective optical element 122.

The transflective optical element 122 is located between the optical lens module 10 and the image sensor 12. The transflective optical element 122 includes a transflective surface for reflecting the light from the light emitting element 121 to the optical lens module 10 for illuminating the object, and allowing light from the object to pass therethrough and to the image sensor 11. The transflective optical element 122 can be a beam splitter. In an exemplary embodiment, and the transflective optical element 122 is on an optical axis of the optical lens module 10.

Figure 2:
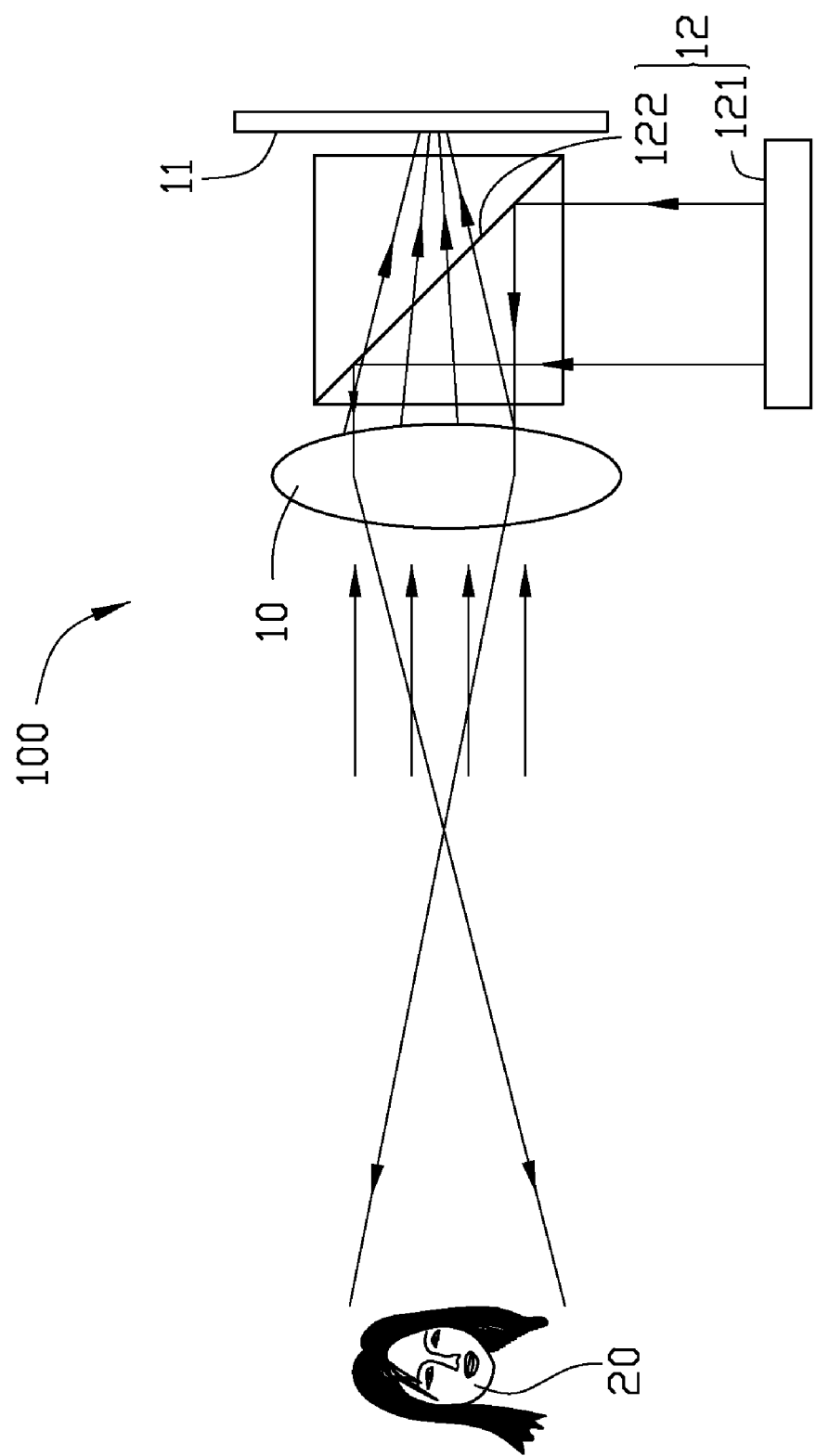
FIG. 2 is a light path diagram of the camera device illustrated in FIG. 1.

Referring to FIG. 2, the light reflected by the transflective optical element 122 passes through the optical lens module 10 and finally illuminates an object 20 (a person for example). The illuminated object 20 reflects light to the optical lens module 10. The optical lens module 10 converge the light reflected from the object 20. Part of the converged light passes through the transflective optical element 122 and reaches the image sensor 11. Thereby, an image of the illuminated object 20 will be sensed by the image sensor 11.

An luminance (E) on the image sensor 11 satisfies condition:

$$E = \pi TBY^2/F_1^2 = \pi TB/2(F/\#)^2 \quad (1)$$

wherein B represents brightness of an object whose image is to be taken by the camera device 100; T represents a transmission ration of the optical lens module 10; $F_1$ represents an effective focal length of the optical lens module 10; Y represents a half value of clear aperture of the camera device 100; F/# represents an aperture coefficient of the camera device 100, i.e. F-number of the camera device 100 in optics. In an exemplary embodiment, the aperture coefficient of the camera device 100 is in a range from 2.4 to 4.0. In a further exemplary embodiment, the camera device 100 has an aperture coefficient of 2.8.

From the expression (1), it can clearly seen that the luminance (E) on the image sensor 11 is in direct ratio with the object brightness (B) and in inverse ratio with a square of the aperture coefficient (F/#) of the camera device 100. As such, a requested luminance (E) on the image sensor 11 can be achieved by increasing the object brightness (B) without decreasing the aperture coefficient (F/#) of the camera device 100. Following tables show numerical data on the luminance (E), the object brightness (B) and the aperture coefficient (F/#), in exemplary embodiments.

| Requested luminance (E) on image sensor | Aperture coefficient (F/#) of camera device | Brightness (B) of object |
| --- | --- | --- |
| 1.96 | 2.0 | 1.96 |
| 2.17 | 1.9 | 2.17 |
| 2.42 | 1.8 | 2.42 |
| 2.71 | 1.7 | 2.71 |
| 3.06 | 1.6 | 3.06 |
| 3.48 | 1.5 | 3.48 |
| 4.00 | 1.4 | 4.00 |
| 4.64 | 1.3 | 4.64 |
| 5.44 | 1.2 | 5.44 |
| 6.48 | 1.1 | 6.48 |
| 7.84 | 1.0 | 7.84 |

Accordingly, the luminance (E) on the image sensor 11 can be improved by using the light emitting module 12 to illuminate the object 20. As long as the light emitting module 12 is controlled to have a predetermined luminance on the object 20, As such, requested luminance (E) on the image sensor 11 can be easily and precisely achieved by adjusting the light emitting module 12 to have a predetermined luminance on the object 20 according to the requested improvement of the luminance (E).

Due to the camera device 100 being equipped with the light emitting module 12 and an luminance over the image sensor 11 is improved by the illumination of the light emitting module 12, the aperture coefficient of the camera device 100 will not be decreased and high definition of images are retrieved accordingly. Further, the transflective optical element 122 is integrated between the optical lens module 10 and the image sensor 12, thereby the camera device 100 has satisfied compact configuration and further reduction in size of the camera device 100 is possible.

Finally, it is to be understood that the above-described embodiments are intended to illustrate rather than limit the disclosure. Variations may be made to the embodiments without departing from the spirit of the disclosure as claimed. The above-described embodiment illustrates the scope of the disclosure but do not restrict the scope of the disclosure.

What is claimed is:

1. A camera device, comprising:
    an optical lens module for forming an image of an object on an image plane associated therewith;
    an image sensor disposed on the image plane of the optical lens module, the image sensor configured for capturing the image formed by the optical lens module; and
    a light emitting module comprising
        a transflective optical element located between the optical lens module and the image sensor, and
        a light emitting element facing towards the transflective optical element, the light emitting element being for emitting light to the transflective optical element, the transflective optical element including a transflective surface for reflecting the light from the light emitting element to the optical lens module for illuminating the object, and allowing light from the object to pass therethrough and to the image sensor.

2. The camera device according to claim 1, wherein the light emitting element comprises a light emitting diode, a light emitting diode chip or a light emitting diode module.

3. The camera device according to claim 1, wherein the light emitting element is configured for emitting white light.

4. The camera device according to claim 1, wherein the transflective optical element is a beam splitter.

5. The camera device according to claim 1, wherein an aperture coefficient of the camera device is in a range from 2.4 to 4.

6. The camera device according to claim 1, wherein the light emitted from the light emitting element is sequentially reflected by the transflective optical element and radiated through the optical lens on the object, and then reflected by the object to sequentially transfer through the optical lens and the light transflective optical element to the image sensor.

* * * * *